United States Patent

Onodera

Patent Number: 5,291,308
Date of Patent: Mar. 1, 1994

[54] IMAGE PROCESSING APPARATUS USING TONAL DEGREE CONVERSION

[75] Inventor: Ken Onodera, Yokohama, Japan

[73] Assignee: Canon Kabushiki Kaisha, Tokyo, Japan

[21] Appl. No.: 717,274

[22] Filed: Jun. 18, 1991

[30] Foreign Application Priority Data

Jun. 25, 1990 [JP] Japan .................. 2-164098

[51] Int. Cl.$^5$ .................. H04N 1/40; H04N 1/00
[52] U.S. Cl. .................. 358/448; 358/404; 358/444; 382/44; 382/46
[58] Field of Search .............. 358/404, 429, 443, 444, 358/445, 447, 448, 449, 451, 452, 455, 456, 457, 460, 461, 462, 465, 466, 467; 382/44, 1, 47, 54, 55

[56] References Cited

U.S. PATENT DOCUMENTS 3,976,982  8/1976  Eiselen .................. 382/44

*Primary Examiner*—Edward L. Coles, Sr.
*Assistant Examiner*—Jerome Grant, II
*Attorney, Agent, or Firm*—Fitzpatrick, Cella, Harper & Scinto

[57] ABSTRACT

An image processing apparatus to modify input image and output the modified image to a printer, comprises a buffer memory for storing image information; processing means for subjecting said image information to a modification process including a tonal degree conversion process; and a frame memory for storing said modified image information. In the apparatus, the buffer memory stores one of image information modified and the image information not modified, in accordance with the data quantities of the image information before and after the modification process.

20 Claims, 4 Drawing Sheets

IMAGE PROCESSING APPARATUS USING TONAL DEGREE CONVERSION

BACKGROUND OF THE INVENTION

1. Field of the Invention

The present invention relates to an image processing apparatus capable of modifying inputted image information and outputting the modified information to an output device such as a printer.

2. Related Background Art

In a conventional image processing apparatus of this type, inputted image information is stored in a buffer domain and undergoes modification such as magnification and reduction to develop the result into a frame memory.

In the case of reducing an image by a magnification process, it is necessary to maintain a sufficient buffer domain for storing the image information before modification until the modification/development process is completed. Therefore, a memory working area for a CPU or the like is restricted, resulting in an inefficient use of an empty memory area and a possibility of some difficulty in data processing.

In view of this, it can be considered to use a method whereby inputted image is stored in a buffer domain after it is subjected to a modification process. With this method, however, in the case of magnifying an image by a modification process, the necessary buffer domain becomes larger than that required when an original image is stored. Also in this latter case, there arise similar problems of an inefficient use of an empty memory area and a possibility of some difficulty in data processing.

SUMMARY OF THE INVENTION

It is an object of the present invention to solve the above-described problems.

It is another object of the present invention to provide an image processing apparatus capable of executing a modification process without deteriorating the quality of image information.

It is a further object of the present invention to provide an image processing apparatus capable of saving a domain of a memory to be used for an image modification process.

It is a still further object of the present invention to provide an image processing apparatus capable of efficiently using a main memory by limiting the buffer domain of a main memory to be used for an image information modification process.

According to the present invention, a modification process for image information is performed either at the time of developing the image information into a frame memory or at the time of storing the image information into a buffer domain, depending upon the data size of the image information before and after modification, thereby saving the memory area used as the buffer domain.

Other objects and advantages of the present invention will become more apparent from the following detailed description and appended claims when read in conjunction with the accompanying drawings.

DETAILED DESCRIPTION OF THE EMBODIMENT

Figure 1:
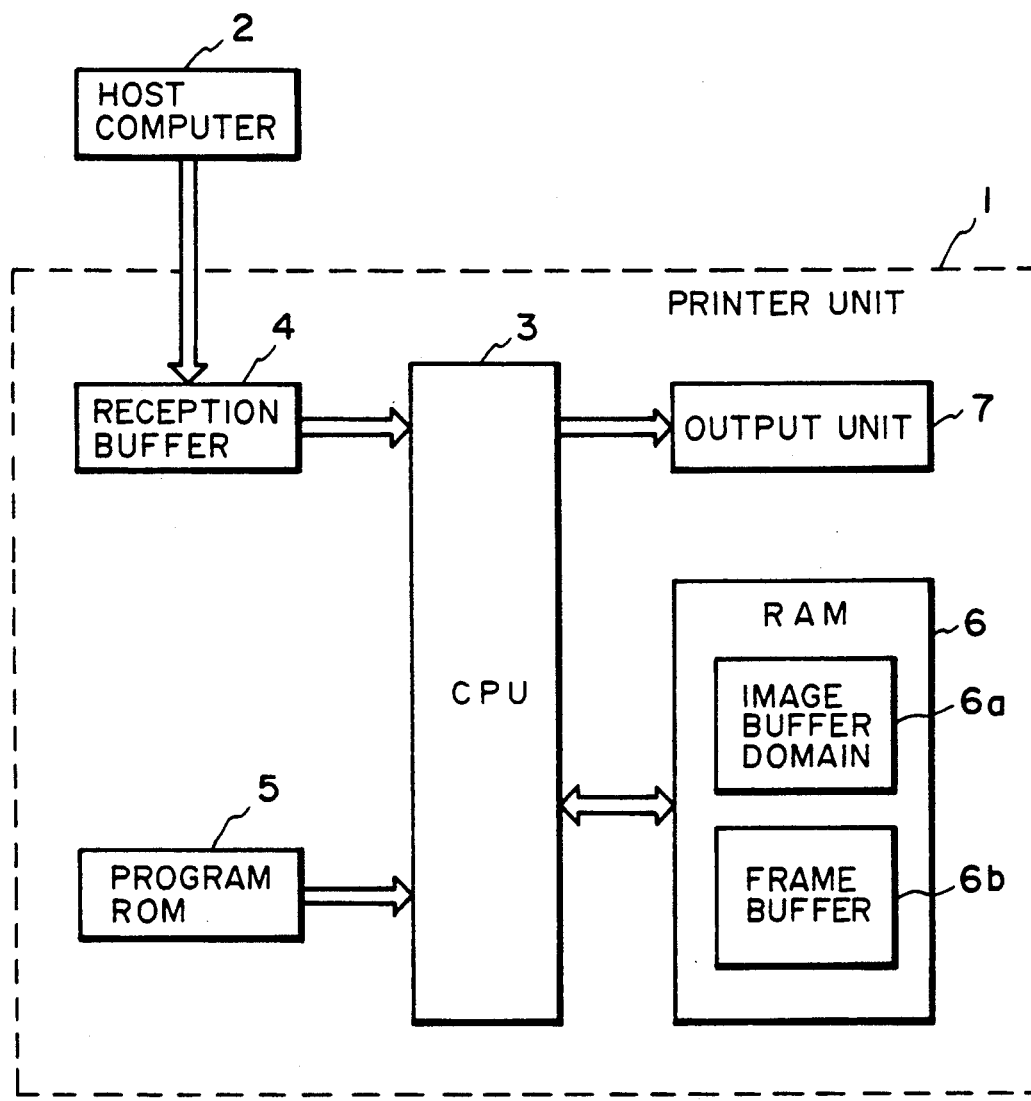
FIG. 1 is a block diagram illustrating the structure of a printer according to an embodiment of the present invention.

FIG. 1 is a block diagram showing the structure of a printer according to an embodiment of the present invention. In FIG. 1, reference numeral 1 generally represents a printer to which an external host computer 2 is connected via a connector (not shown). The printer 1 receives a print instruction, an image instruction, or the like from the host computer 2, and prints received data.

Reference numeral 3 represents a CPU which controls all devices of the printer 1 in accordance with a control program (including a procedure to be described later and shown in the flow chart of FIG. 3) stored in a program ROM 5. Reference numeral 4 represents a reception buffer which stores data such as a print instruction, an image instruction or the like received from the host computer 2. Reference numeral 6 represents a RAM serving as a main memory and having an image buffer domain 6a for storing image information, and a frame buffer 6b for storing a dot image of, e.g., one page to be outputted to an output unit 7.

With the printer constructed as above, when a deformation of image information is instructed, a buffer development means (in this embodiment, corresponding to CPU 3) develops the image information with or without modification into the buffer memory (in this embodiment, corresponding to the image buffer domain 6a), in accordance with the image sizes before and after the modification obtained by analyzing designated modification information, while preventing an extension of the image buffer domain 6a which might otherwise be extended by the modification process.

Figure 2:
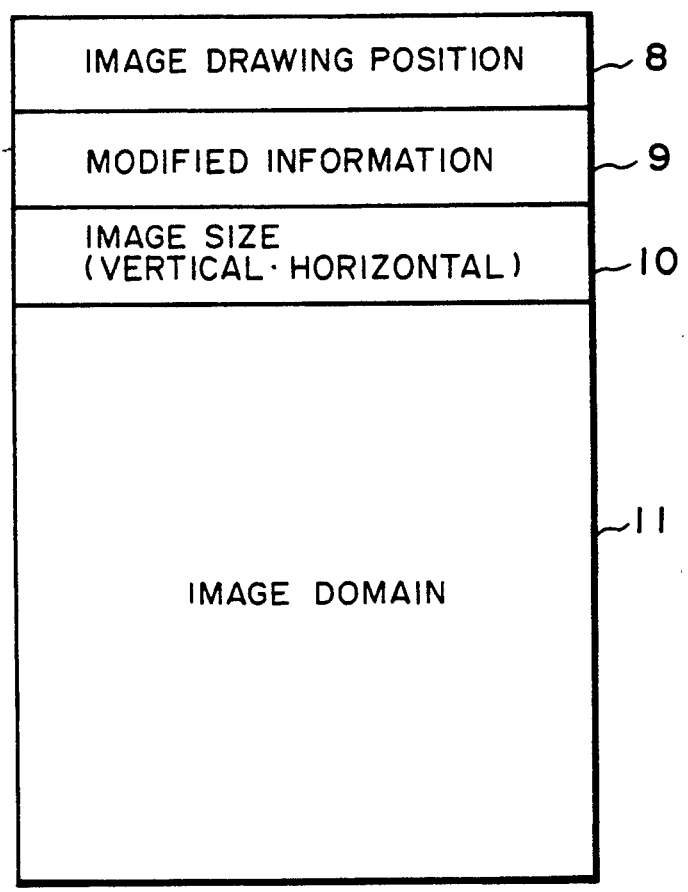
FIG. 2 is a schematic diagram showing a memory map of the image, buffer domain of FIG. 1.

FIG. 2 is a schematic memory map of the image buffer domain shown in FIG. 1. Reference numeral 8 represents an image drawing position area, the position being representative of the development position of the image into the frame buffer 6b. Reference numeral 9 represents an image modification information area, the information being expressed by a primary conversion parameter or the like. Reference numeral 10 represents an image size area, the size including a vertical size and horizontal size of a stored image. Reference numeral 11 represents an image area for storing image information.

The image modification/development process to be executed by the printer of the present invention will be described with reference to the flow chart shown in FIG. 3.

Figure 3:
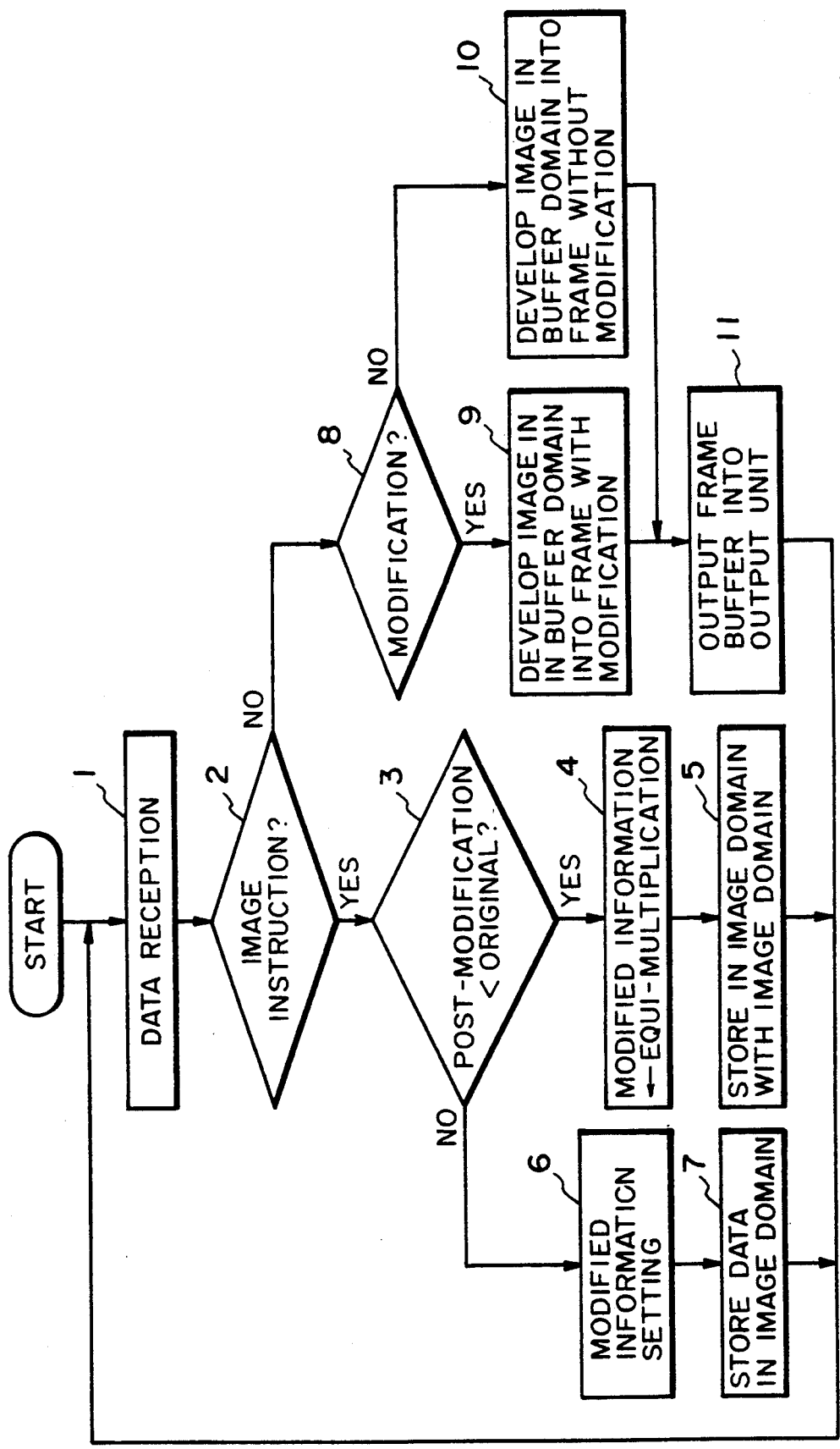
FIG. 3 is a flow chart illustrating an example of image modification/development processes for a printer according to the present invention.

The flow chart of FIG. 3 illustrates an example of the image modification/development procedure to be executed by the printer of the present invention. The flow chart includes steps 1 to 11.

First, the printer 1 is powered to receive data from the host computer 2 (step 1). The received data is stored in the reception buffer 4, and thereafter data of one unit code is read from the reception buffer 4. Next, it is checked if the read data is an image instruction or not (step 2). In the case of an image instruction, the information of the sizes of an original image and post-modification image is extracted from the image instruction, to check whether or not the size of the post-modification image is smaller than the size of the original image (step 3). If smaller, the corresponding position is stored in the image drawing position area 8 of the buffer domain 6a, "equi-multiplication modification" information is stored in the modification information area 9, and the size of the post-modification image is stored in the size area 10 (step 4). The image data of the reception buffer 4 is modified and stored in the image domain 11 (step 5).

If the judgment at step 3 is negated (if the size of the post-modification image is equal to or larger than that of the original image), the corresponding position is stored in the image drawing area 8 of the image buffer domain 6a, "modification" information is stored in the modification information area 9, and the size of the original image is stored in the size area 10. The image data in the reception buffer 4 is directly stored in the image domain 11 to thereafter return to step 1.

If the judgment at step 2 is negated (in the case of paper feed instruction), in order to develop the image stored in the image buffer domain 6a into the frame buffer area 6b, it is checked if the contents of the modification information 9 in the image buffer area 6a indicate a modification or not (step 8). In the case of a modification, the image stored in the image domain 11 is modified and developed into the frame buffer area 6b (step 9). The contents of the frame buffer area 6b are outputted to the output unit 7 (step 11) to print the image and thereafter return to step 1.

If the judgment at step 8 is negated, the image stored in the image domain 11 is directly developed into the frame buffer area 6b (step 10) to then advance to step 11.

As described above, with the image processing apparatus of this embodiment, if the image information including the modification information is designated, the buffer development means (in this embodiment, corresponding to CPU 3) analyzes the modification information of the image information to calculate the sizes of the original image and post-modification image. If the original image size is larger, the image data is modified and stored, together with the equi-multiplication modification information, in the image buffer domain (in this embodiment, corresponding to the image buffer domain 6a). On the other hand, if the post-modification image is larger, the inputted image data is directly stored, together with the original image modification information, in the image buffer domain (in this embodiment, corresponding to the image buffer domain 6a).

In this embodiment, the modification information is overwritten as the "equi-multiplication" information when the modified image information is buffered. Instead, a flag representative of whether image is required to be modified or not may be provided, and this flag is set or reset.

An example of a detailed modification process will be given below. In this embodiment, the modification information includes a magnification/reduction factor, a modification vector, and a bit/pixel. The magnification/reduction factor is information indicating how the width and height of an image are magnified/ reduced.

Figure 4:
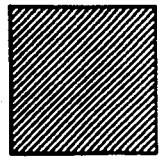
FIG. 4 shows, an example of a modification process according to the present invention.
Figure 4:
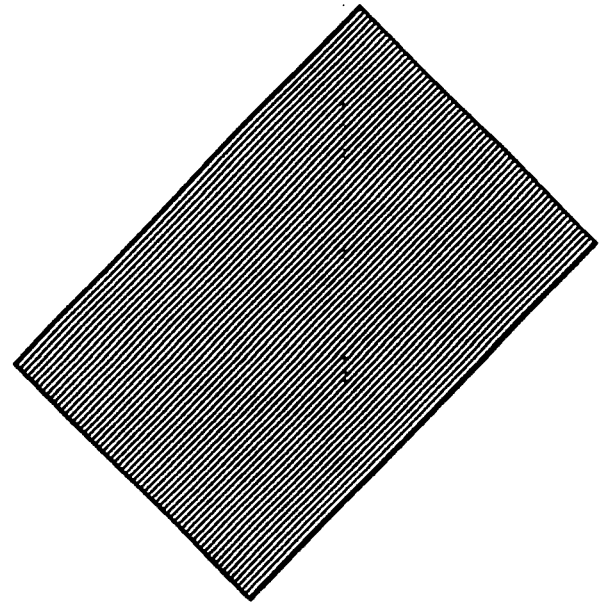

The modification vector is information how the width direction vector and height direction vector of an image are modified. For example, an image is modified as shown in FIG. 4, assuming that the magnification/reduction factor is a two-fold in the width direction and a three-fold in the height direction, and the modification vector is 45 degrees toward bottom right in the width direction and 45 degrees toward bottom left in the height direction. An image is required to be stored as a rectangle in the image buffer in order to develop it into the frame memory. Therefore, the size of an image buffer required becomes 12 times as large as the original image. The bit/pixel is information indicating the number of bits each pixel of image data has. In general, a frame memory has a tonal degree same as that of an output unit, i.e., same as the bit/pixel of the output unit, in order to speed up the data transfer to the output unit. If the bit/pixel of an image data is different from that of a frame buffer, it becomes necessary to execute a bit/pixel conversion. For example, in this embodiment, the output unit is constructed to process binary data and so the frame buffer is constructed also to process binary data. Therefore, if multivalue image data is to be processed, this data is required to be converted into binary data. Such conversion operation also influences the storage size of the image buffer. Namely, if image data is of 8 bits/pixel, the size is reduced by one eighth.

If the efficiency of the an image buffer only is considered, it is advantageous to convert an image data into binary data and store it in the buffer. However, if image data whose data amount has been reduced through binarization is subjected to a magnification/reduction/vector modification process, the image quality is considerably deteriorated. In view of this, in order to preserve the original image quality, it is necessary to carry out the magnification/reduction/vector modification process of image data at the stage of multi-value data, and thereafter binarize it. Accordingly, in order to compare the sizes of the original image and post-modification image, it is necessary to compare the size of an image not subjected to any modification with the size of the image subjected to modification (conversion).

A more detailed description will be given in this connection. In the present embodiment, the image instruction includes the total number of bytes of an image, a drawing position (x, y), the number of pixels in the width direction, the number of pixels in the height direction, a magnification factor in the width direction, a magnification factor in the height direction, a width direction vector (x, y), a height direction vector (x, y), a bit/pixel, and image data.

Figure 5:
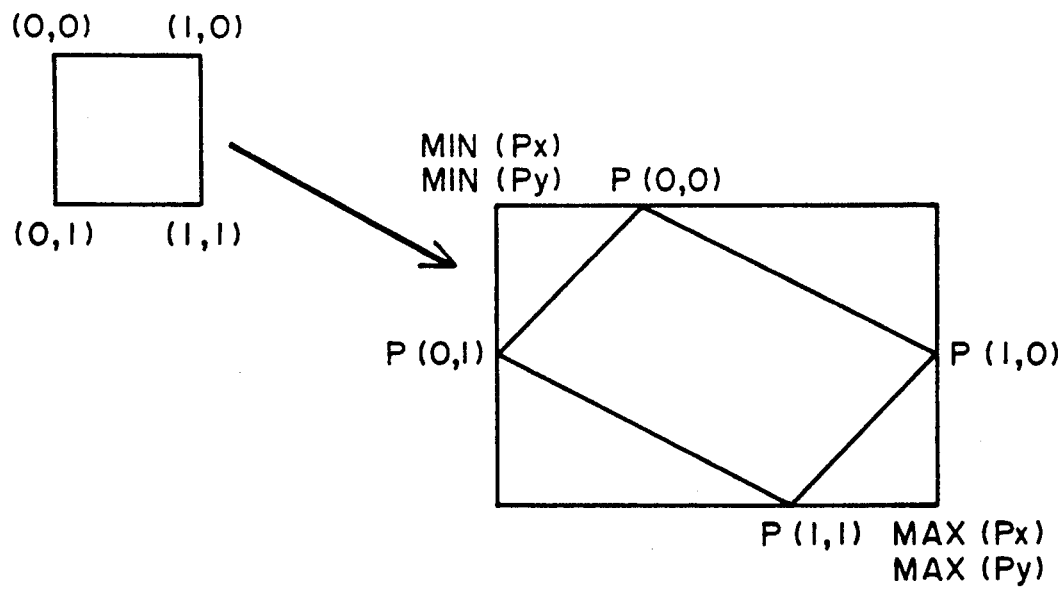
FIG. 5 is a diagram illustrating another example of a modification process according to the present invention.

When the printer of the present invention receives such an image instruction, the total number of bytes of an image is set to the data size of the image before modification {the total number corresponds to (the number of pixels in the width direction)×(bit/pixel)/8×(the number of pixels in the height direction)}. Next, the data size of an image after modification is calculated in the following manner, as illustrated in FIG. 5.

$Px(0, 0)=0, Py(0, 0)=0$ $Px(1, 0)=$(width pixel number)×(width direction magnification factor)×(width direction vector x)/(width direction vector length)

$Py(1, 0)=$(width pixel number)×(width direction magnification factor)×(width direction vector y)/(width direction vector length)

Px(0, 1) = (height pixel number) × (height direction magnification factor) × (height vector x)/(height direction vector length)

Py(0, 1) = (height pixel number) × (height direction magnification factor) × (height direction vector y)/(height direction vector length)

Px(1, 1) = Px(1, 0) + Px(0, 1)

Py(1, 1) = Py(1, 0) + Py(0, 1)

Data size after modification = (MAX (Px(x, y)) − MIN(Px(x, y)))/8 × (MAX(Py(x, y)) − (MIN (Py(x, y)))

The data sizes before and after modification are calculated in the above manner, and compared with each other. A memory area corresponding to (smaller data size + modification information areas) is dynamically reserved in RAM. If the data size before modification is smaller, in the modification information area there are set the drawing position (x, y), width pixel number, height pixel number, width direction magnification factor, height direction magnification factor, width direction vector (x, y), height direction vector (x, y), and bit/pixel, and the image data is written in the image domain. On the other hand, if the data size after modification is smaller, as the modification information there are set the width pixel number after modification, height pixel number after modification, width direction magnification factor after modification, height direction magnification factor after modification, width direction vector (x, y) after modification, height direction vector (x, y) after modification, and bit/pixel after modification, and the image data is written in the image domain while magnifying/reducing/ modifying/binarizing the image data by the image modification process. As the post-modification values in the modification information area, the drawing position (x, y) is set to the drawing position after modification (x + MIN (Px(x, y)), y + MIN (Py(x, y))), the width pixel number is set to the width pixel number after modification (MAX (Px(x, y)) − MIN (Px(x, y)), the height pixel number is set to the height pixel number after modification (MAX (Py(x, y)) − MIN (Py(x, y))), the width and height direction magnification factors are set to 1, the width direction vector (x, y) is set to (1, 0), the height direction vector (x, y) is set to (0, 1), and the bit/pixel is set to 1. These width direction magnification factor, height direction magnification factor, width direction vector (x, y), height direction vector (x, y), and bit/pixel indicate that modification is not necessary. MIN (Px(x,y)) is the minimum value in Px(x,y) array, and MAX (Px(x,y)) is the maximum value in Px(x,y) array.

In the above embodiment, a single image buffer domain 6a is used. A plurality of image buffer domains may be used instead.

In the above embodiment, the size of the frame buffer 6b corresponds to the full area of a single paper sheet. The present invention is applicable to a so-called partial frame buffer of the type that it stores a portion of an image and the image data is renewed while a paper sheet is fed.

Furthermore, in the above-described embodiment, magnification, reduction, and vector modification has been described as the image modification process. Other modifications such as integer number multiplication, real number multiplication, rotation, and skewing may also be used.

Still further, a modification process including binarization has been described. Binary image data may be converted into multi-value image data using a dither method, dot pattern method, average density method, error diffusion method, or the like. The present invention is generally applicable to the case where image information of n bit/pixel is converted into image information of m (not equal to n) bit/pixel.

The modification process may be realized by customized hardware.

If an original image is not subject to any modification, the image data may be processed by another logic circuit.

As described so far, according to the present invention, there is provided the buffer development means for developing the image information with or without modification into the buffer memory, in accordance with the image sizes before and after the modification obtained by analyzing designated modification information. Therefore, the main memory can be used efficiently, while preventing an extension of the image buffer domain within the main memory, which might otherwise be extended by the modification process. A working area necessary for printing control can be therefore reserved always stably, allowing a data processing with high operability.

I claim:

1. An image processing apparatus comprising:
   input means for inputting image information as unmodified image information;
   a buffer memory for storing said image information inputted by said input means;
   processing means for subjecting said image information to a modification process including a tonal degree conversion process; and
   a frame memory for storing modified image information,
   wherein said buffer memory selectively retains one of the modified image information and the unmodified image information, and
   wherein said processing means transfers the modified image information from the buffer memory to the frame memory when said buffer memory retains the modified image information, and said processing means generates the modified image information on the basis of the unmodified image information in the buffer memory and writes the modified image information in the frame memory when said buffer memory retains the unmodified image information.

2. An image processing apparatus according to claim 1, wherein said input means inputs said image information and modification information, and
   wherein said apparatus further comprises calculation means for calculating a data quantity of said image information after said modification process, in accordance with said image information and said modification information.

3. An image processing apparatus according to claim 2, wherein said apparatus overwrites said modification information when said modified image information is stored in said buffer memory.

4. An image processing apparatus according to claim 1, wherein said processing means performs, as said modification process, an image rotation, image magnification, or image reduction process, and a tonal degree conversion process.

5. An image processing apparatus according to claim 4, wherein said processing means performs, as said tonal degree conversion process, a binarization process of converting multi-value image information into binary image information.

6. An image processing apparatus according to claim 1, wherein said frame memory stores image information of one page.

7. An image processing apparatus according to claim 1, further comprising output means for outputting said image information stored in said frame memory to image forming means.

8. A method for processing an image comprising the steps of:
inputting image information and modification information for said image information;
calculating a data quantity of modified image information, in accordance with said inputted image information and modification information;
comparing a data quantity of said image information not modified with the data quantity calculated in said calculation step; and
modifying said image information, wherein, if said comparison step indicates that the data quantity of said information not modified is larger, said image information is modified in accordance with said modification information and is stored in a buffer memory, and said modification information is overwritten, and wherein, if said comparison step indicates that the data quantity calculated in said calculating step is larger, said image information is stored in the buffer memory and said image information stored in said buffer memory is modified in accordance with said modification information and is stored in a frame memory.

9. A method according to claim 8, wherein said modifying the image information comprises at least one of an image rotation process, an image magnification process and an image reduction process.

10. A method according to claim 8, wherein said modifying the image information comprises a gradation process.

11. A method according to claim 10, wherein said gradation process is a binarization process.

12. An image processing method comprising the steps of:
inputting image information and modification information representing a modification process to be performed on the image information;
storing in a frame memory the image information modified on the basis of the modification information;
determining whether or not the image information input in said inputting step is stored in the image area of a buffer memory without having been modified;
storing the image information input in said inputting step in the image area of a buffer memory and for storing the modification information input in said inputting step in the image modification area of the buffer memory, when the determination obtained in said determining step is positive;
storing in the image area of the buffer memory the image information obtained by modifying the image information input in said inputting step and storing information different from the modification information input in said inputting step in the image modification area of the buffer memory, when the determination obtained in said determining step is negative; and
generating image information to be stored in the frame memory on the basis of the image information and the modification information stored in the buffer memory.

13. An image processing method according to claim 12, wherein the modification information represents at least one of an image rotation process, an image modification process and an image reduction process.

14. An image processing method according to claim 12, wherein a process conducted in said generating step comprises a gradation processing.

15. An image processing apparatus comprising:
means for inputting image information and modification information representing a modification process to be performed on the image information; and
a frame memory for storing the image information modified on the basis of the modification information,
wherein said apparatus further comprises:
a buffer memory having an image area for storing the image information and an image modification area for storing the modification information;
means for determining whether or not the image information input by said input means is stored in the image area of said buffer memory without having been modified;
means for storing the image information input by said input means in the image area of said buffer memory and for storing the modification information input by said input means in the image modification area of said buffer memory, when the determination by the determining means is positive;
means for storing in the image area of said buffer memory the image information obtained by modifying the image information input by said input means and for storing information different from the modification information input by said input means in the image modification area of said buffer memory, when the determination by said determining means is negative; and
process means for generating image information to be stored in said frame memory on the basis of the image information and the modification information stored in the buffer memory.

16. An image processing apparatus according to claim 15, wherein said determination means performs its determination on the basis of a used amount of said buffer memory.

17. An image processing apparatus according to claim 15, further comprising means for recording the image information stored in said frame memory.

18. An image processing apparatus according to claim 15, wherein the modification information represents at least one of an image rotation process, an image modification process and an image reduction process.

19. An image processing apparatus according to claim 15, wherein a process conducted by said process means comprises a gradation processing.

20. An image processing apparatus according to claim 19, wherein said gradation processing comprises a binarization process.

* * * * *

UNITED STATES PATENT AND TRADEMARK OFFICE
CERTIFICATE OF CORRECTION

PATENT NO. : 5,291,308
DATED : March 1, 1994
INVENTOR(S) : KEN ONODERA

It is certified that error appears in the above-indentified patent and that said Letters Patent is hereby corrected as shown below:

IN THE DRAWINGS

Sheet 3 of 4, fig. 4, "IN IN" should read --IN--.

COLUMN 2

Line 7, "image," should read --image--.

Signed and Sealed this

Fourth Day of October, 1994

Attest:

BRUCE LEHMAN

Attesting Officer

Commissioner of Patents and Trademarks